United States Patent [19]

Waugh et al.

[11] Patent Number: 4,737,225

[45] Date of Patent: * Apr. 12, 1988

[54] METHOD OF MAKING A SUBSTRATELESS DECORATIVE ARTICLE

[75] Inventors: Robert E. Waugh, Sun City Center, Fla.; Urban R. Nannig, North Kingstown, R.I.; Clyde R. Rockwood, Columbus, Ohio

[73] Assignee: The D. L. Auld Company, Columbus, Ohio

[*] Notice: The portion of the term of this patent subsequent to Sep. 16, 2003 has been disclaimed.

[21] Appl. No.: 820,106

[22] Filed: Jan. 21, 1986

Related U.S. Application Data

[63] Continuation-in-part of Ser. No. 744,014, Jun. 12, 1985, Pat. No. 4,612,075, and a continuation-in-part of Ser. No. 744,128, Jun. 12, 1985, Pat. No. 4,615,754.

[51] Int. Cl.[4] .................... B32B 31/00; B27B 17/00; B28B 11/06; C04B 41/00
[52] U.S. Cl. ..................... 156/242; 156/247; 156/277; 264/130; 264/131; 264/132; 428/352
[58] Field of Search ............ 156/242, 108, 244.12, 156/244.16, 246, 249, 276, 277, 289, 247; 264/130, 132, 510, 514; 427/203, 180, 444, 54.1; 283/67; 428/44, 67, 352, 135, 164, 174; 101/465

[56] References Cited

U.S. PATENT DOCUMENTS

| | | |
|---|---|---|
| 1,693,561 | 11/1928 | Klein . |
| 2,021,961 | 11/1935 | MacFarlane . |
| 2,354,857 | 8/1944 | Gits et al. . |
| 2,376,305 | 5/1945 | Bauer . |
| 3,235,396 | 2/1966 | Haberlin . |
| 3,502,496 | 3/1970 | Jarvis et al. ............... 264/130 |
| 3,964,906 | 6/1976 | Kenney . |
| 3,974,311 | 8/1976 | Cherrin . |
| 4,100,010 | 7/1978 | Waugh . |
| 4,135,033 | 1/1979 | Lawton ..................... 428/352 |
| 4,210,693 | 7/1980 | Regan et al. ................ 428/44 |
| 4,259,388 | 3/1981 | Reed ......................... 428/174 |
| 4,331,704 | 5/1982 | Watson, Jr. et al. .......... 428/54.1 |
| 4,332,074 | 6/1982 | Auld et al. .................. 428/135 |
| 4,351,686 | 9/1982 | Clark . |
| 4,356,617 | 11/1982 | Cascia ........................ 264/132 |
| 4,409,264 | 10/1983 | Gilleo et al. . |
| 4,446,179 | 5/1984 | Waugh . |
| 4,460,429 | 7/1984 | Coscia et al. . |
| 4,481,160 | 11/1984 | Bree . |
| 4,521,479 | 6/1985 | Maglio et al. ............... 427/180 |
| 4,605,575 | 8/1986 | Auld et al. ................... 428/164 |

FOREIGN PATENT DOCUMENTS

| | | |
|---|---|---|
| 93984 | 6/1983 | Japan . |
| 136078 | 10/1983 | Japan . |
| 192679 | 12/1983 | Japan . |

Primary Examiner—Donald E. Czaja
Assistant Examiner—Louis Falasio
Attorney, Agent, or Firm—Killworth, Gottman, Hagan & Schaeff

[57] ABSTRACT

A decorative article and method of manufacture are provided. The article includes a plastic cap overlying a printed and/or decorated upper surface of an adhesive layer. The need for an intermediate metal, plastic, or paper substrate is eleiminated. By treating the upper surface of the adhesive to render it substantially tack free, the printing and/or decoration may be applied to that surface and the cap formed directly thereon.

10 Claims, 1 Drawing Sheet

METHOD OF MAKING A SUBSTRATELESS DECORATIVE ARTICLE

CROSS REFERENCE TO RELATED APPLICATIONS

This application is a continuation-in-part of copending U.S. applications Ser. Nos. 744,014, filed June 12, 1985 now U.S. Pat. No. 4,612,075, issued Sept. 16, 1986 and 744,128, filed June 12, 1985 now U.S. Pat. No. 4,615,754, issued Oct. 7, 1986.

BACKGROUND OF THE INVENTION

This invention relates to methods for the manufacture of decorative articles, and more particularly to a method of manufacture of plastic capped articles having decorative indicia printed directly onto an adhesive layer.

Decorative plaques, emblems, and articles are widely used throughout a number of industries, including the automotive and appliance industry. Many of these decorative articles are formed on metal or plastic substrates onto which a liquid plastic resin is cast. The plastic resin cures to form a convex or positive meniscus-shaped cap over the substrate which gives a lens effect to the printed decorative indicia on the substrate. Such articles are conventionally adhered to their intended surface, such as an automobile or appliance body, utilizing a pressure sensitive adhesive coated on the back of the article substrate.

For example, Waugh, U.S. Pat. No. 4,100,010, discloses a method for the manufacture of plastic-capped decorative articles which utilizes a flat, decorated foil substrate which can be either metal, paper, or plastic. Onto this decorated foil substrate, a liquid plastic resin is cast which flows to the peripheral side walls of the substrate and forms a positive meniscus or lens cap over the substrate. Likewise, Reed, U.S. Pat. No. 4,259,388, also describes a plastic-capped medallion which is formed on a flexible plastic substrate. Both Reed and Gilleo et al, U.S. Pat. No. 4,409,264, describe the use of a non-wetting material or so-called low surface energy dams to confine the flow of liquid plastic resin during casting.

However, the need for thin metal or plastic substrates to provide a surface for printing the decorative indicia and for supporting the cap poses a number of problems in the manufacture of such decorative articles. The cost of such substrates represents a significant portion of the cost of the article. Typically, such substrates have an adhesive backing and are carried on a release liner or other support sheet. The individual articles are formed by a die cutting operation, termed "kiss cutting", where the substrate is cut by the die but the underlying support sheet is not. A considerable portion of the substrate material must then be stripped off of the support sheet ("weeding") and discarded as scrap. This weeding operation introduces a significant labor and time expense to the manufacturing process in addition to producing large amounts of scrap.

Such die cutting operations, as well as embossing of the substrate, may also cause deformation of the substrate or a burring of the edges of the cut out substrates. Such deformation and burred edges introduce problems during the casting of liquid plastic resin onto the substrate and may cause overflow of the resin over the edges of the substrate. Also, kiss cutting sometimes accidently results in partial severing of the underlying support sheet. If that support sheet is held down by vacuum as in Waugh U.S. Pat. No. 4,100,010, then, during resin casting the vacuum may "pull at" the resin through the severed support sheet, causing overflow.

Finally, deformation and curling of the substrate during curing of the plastic resin may also occur because of differences in expansion and contraction rates of the plastic resin and substrate material. For example, as the plastic resin cures, some shrinkage may occur which causes substrate curling.

Accordingly, the need exists in the art for a decorative article and method of manufacture which avoids the problems of the prior art and yet which is relatively inexpensive to manufacture.

SUMMARY OF THE INVENTION

The present invention provides a process for the manufacture of plastic-capped decorative articles in which decorative indicia are printed directly onto a detackified adhesive layer prior to applying a plastic cap. According to one aspect of the present invention, a substrateless decorative article is made by the steps of providing a layer of a pressure sensitive adhesive on a support sheet. The pressure sensitive adhesive surface is treated to render the upper surface of the adhesive substantially tack free and suitable for silk screening or otherwise printing directly on the treated upper surface.

The treated upper surface of the adhesive is then decorated by silkscreening or otherwise printing background colors and/or indicia thereon. A measured amount of a curable liquid plastic resin may be cast, sprayed, or otherwise coated onto the decorated surface. The resin is then cured and hardened to provide a substrateless decorative article having a plastic cap. Alternatively, a relatively thin flat cap may be applied by flow coating, spraying, extruding or laminating a plastic layer to the decorated surface.

Preferably, the article assembly also includes a release liner. Thus, a preferred method of forming the decorative article of the present invention includes providing a layer of pressure sensitive adhesive supported on a sheet of release liner. The adhesive may be applied to the release liner in a conventional manner such as by spraying or roll coating. A plurality of article designs may be formed on the adhesive layer by suitable silkscreening techniques. After the articles have been formed and the plastic caps applied, this sheet now bearing a plurality of articles, may be shipped to the user where the individual article may be readily peeled off of the release line and is ready to be adhered to an intended surface such as the surface of an automobile body or applicance. A die cutting operation can also be used to separate individual articles (with release liner attached) from the overall assembly.

The present invention thus provides a decorative article without the need for the metal, plastic, or paper substrate required by prior art emblems and articles and without the concomitant problems associated with forming and curing such emblems and articles. Accordingly, it is an object of the present invention to provide a method of making a substrateless decorative article. This, and other objects and advantages of the invention, will become apparent from the following detailed description, the accompanying drawings, and the appended claims.

DETAILED DESCRIPTION OF THE PREFERRED EMBODIMENTS

Figure 1:
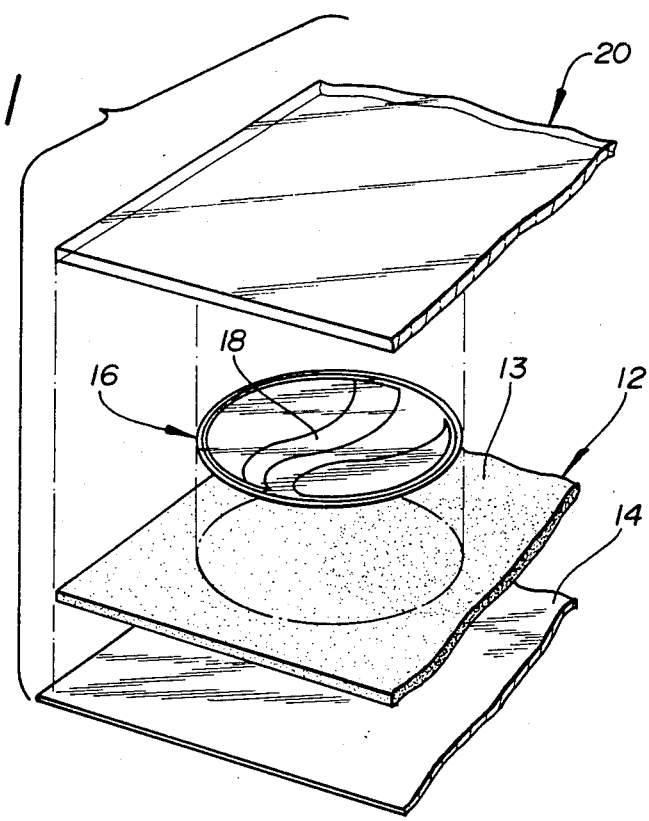
FIG. 1 is an exploded perspective view in partial section of the decorated layer of pressure sensitive adhesive with a layer of plastic laminate.
Figure 2:
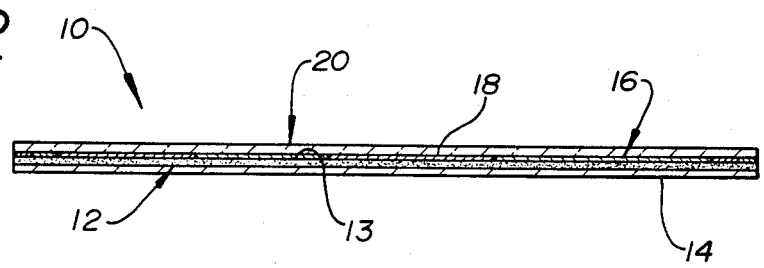
FIG. 2 is a cross-sectional view of an article produced by the process of the present invention—as die cut from the assembly of FIG. 1.

FIGS. 1 and 2 illustrate in cross-sectional and exploded perspective views a substrateless decorative article made in accordance with one embodiment of the process of the present invention. In the embodiment shown in FIG. 2, article 10 has a layer of pressure sensitive adhesive 12 having an upper and a lower surface. Pressure sensitive adhesive 12 can be any of a number of commercially available adhesives such as, for example, an acrylic pressure sensitive adhesive. The lower surface of adhesive 12 is adhered to a release liner 14. Liner 14 is preferably coated with a release material such as a silicone-based polymer which permits ready removal of article 10 when it is desired to adhere the article to an intended substrate such as an automobile body, appliance, or the like.

The upper surface 13 of adhesive 12 has been treated, as explained in further detail below, to render it substantially tack free. As shown in the figures, a non-tacky surface 16 covers the upper surface of adhesive 12. Non-tacky surface 16 is preferably a clear lacquer coating, but may also be a particle layer (such as talc or mica). Alternatively, a thin bright metallic layer, approximately 0.0001 inch thick or less, may be applied by hot stamping or spray metallizing, and serves to provide a bright or colored background for indicia 18 printed thereon. Indicia 18 may be any desirable decoration including words, numbers, symbols, pictures, or combinations thereof. Adhesive 12 may itself be colored, by any number of means including the addition of dyes or pigments, to serve as a background for indicia 18.

In one method of manufacture, a plurality of individual decorated articles may be supported on a single larger sheet or web of release liner 14. Liquid plastic resin may then be cast, coated, sprayed, extruded or otherwise applied over the entire sheet or web. Such a procedure produces a relatively flat plastic cap over the entire sheet. Then, individual articles may be die cut, stamped out, or otherwise separated from the larger sheet. In a preferred procedure, the individual articles may be kiss-cut (i.e., cut through to release liner 14) and left on the larger sheet. In this manner, they may be shipped and sold to ultimate users who may then readily peel individual articles from the release liner 14 for adherance to intended substrates.

Referring now to FIG. 1, another method of manufacture is shown. Initially, a layer of pressure sensitive adhesive 12 is coated onto release liner 14. Adhesive 12 may be applied to liner 14 by any suitable means such as by spraying or roll or dip coating. Preferably, adhesive layer 12 is applied in a thickness of from between about 0.002 to 0.010 inches.

The adhesive 12 is then treated to render the upper surface 13 of the adhesive substantially tack free and suitable for printing indicia 18 directly thereon. The lower surface of adhesive 12 remains tacky so that the finished article may be adhered to an intended surface. The treatment of upper surface 13 of adhesive 12 to render it substantially tack free may be accomplished by a number of different procedures. Preferably, upper surface 13 may be overcoated with a clear or colored lacquer which forms non-tacky layer 16 and seals the upper surface of the adhesive. Alternatively, upper surface 13 may be dusted with a fine powder of inert particles such as mica.

In yet another alternative procedure, a bright metallic surface may be applied to upper surface 13. This can be accomplished by applying a bright metal hot stamp foil to upper surface 13 by means of a pressure roll or the like. The foil is accompanied by a carrier film which is then stripped away leaving bright metallic non-tacky surface 16. A metallic non-tacky surface may have a silver or gold color, or other colors may be used as desired. The overall thickness of the bright metallic surface is desirably 0.001 inches or less.

Once upper surface 13 of adhesive layer 12 has been rendered substantially tack free, any suitable indicia 18 may be printed directly thereon. These indicia may include letters, numbers, words, symbols, pictures, or other decoration. The printing may be accomplished by any of a number of printing techniques which are know in the art, including silkscreen printing.

Adhesive layer 12 may itself be colored by the addition of suitable pigments or dyes to the composition. If layer 12 is already colored, the need for printing a colored background is eliminated. Likewise, if layer 12 is clear, areas of the upper surface may be left undecorated by indicia 18 so that when applied to a substrate (such as a chrome plated surface) the color or brightness of the substrate shows through in those areas.

After printing, a clear or colored plastic sheet 20 is laminated to the assembly. Any of a number of different plastics may be utilized depending upon the effect desired, and the intended environment for the article. For example, tough weather-resistant plastics such as polyurethanes or polycarbonates may be utilized if the article is to be exposed to outdoor conditions. If flexibility is desired, the layer may be a polyester or polyolefin plastic. To insure that the plastic layer adheres permanently to the decorated assembly, the lower surface of layer 20 may have an adhesive thereon to bond to the assembly.

Again, individual articles 10 may be die cut, stamped out, or otherwise separated from a larger sheet to produce individual articles as shown in FIG. 1. While the drawing figures illustrate circular articles, it will be apparent to those skilled in the art that articles of any shape, including ovals, rectangles, squares, and the like, may be formed. Additionally, articles in the form of elongated strips for use as trim strips or the like on automobile bodies may also be produced by the process of the present invention.

In all of the embodiments of the invention, a unique substrateless (i.e. meaning that it has no metal or plastic foil substrate as such) decorative article is produced. That article may be used in areas of traditional emblem use, such as on automobiles and appliances. It may also be used in a number of areas where decalcomania find use.

While the invention has been described in detail and by reference to specific embodiments thereof, it will be apparent that numerous modifications and variations are possible without departing from the scope of the invention, which is defined in the appended claims.

What is claimed is:

1. A method of making a substrateles decorative article comprising the steps of:
   (a) providing a layer of pressure sensitive adhesive having a first and second surface
   (b) treating said first surface of said pressure sensitive adhesive to render said first surface substantially tack free and suitable for printing directly on the treated surface,
   (c) decorating said treated surface by printing indicia directly thereon, and
   (d) forming a transparent plastic layer on said treated surface through which said indicia may be viewed to form a substrateless decorative article with a second surface which remains adhesive and a treated, decorated first surface with said transparent plastic layer thereon.

2. The method of claim 1 in which said treating step includes dusting said first surface of said pressure sensitive adhesive with a powdered material.

3. The method of claim 6 in which said powdered material is mica.

4. The method of claim 1 in which said treating step includes applying a metallic surface to said first surface of said pressure sensitive adhesive.

5. The method of claim 8 wherein said metallic surface is produced by hot stamping a metal foil thereon.

6. The method of claim 1 including the step of separating a plurality of individual shapes from the article of step (d) to form a plurality of individual decorative articles.

7. The method of claim 1 including the step of supporting said layer of pressure sensitive adhesive on a release liner.

8. The method of claim 7 including the steps of peeling said decorative article from said release liner and adhering it to an intended surface.

9. The method of claim 1 wherein said transparent plastic layer is formed on said treated surface by a coating, laminating or extruding a transparent plastic onto said treated surface.

10. The method of claim 1 in which said treating step includes applying a lacquer over said first surface of said pressure sensitive adhesive.

* * * * *